United States Patent [19]

McDonald et al.

[11] Patent Number: 4,500,228
[45] Date of Patent: Feb. 19, 1985

[54] GRANULAR MATERIAL PNEUMATIC TRANSPORT APPARATUS

[75] Inventors: Robert C. McDonald, Waterloo; Derek L. Macartney, Kitchener, both of Canada

[73] Assignee: Joy Manufacturing Company, Pittsburgh, Pa.

[21] Appl. No.: 368,559

[22] Filed: Apr. 15, 1982

[51] Int. Cl.³ ............................................ B65G 53/48
[52] U.S. Cl. ...................................................... 406/61
[58] Field of Search .......................... 406/56, 60, 61, 94

[56] References Cited

U.S. PATENT DOCUMENTS

| 1,304,973 | 5/1919 | Heffelfinger | 406/56 |
| 1,350,419 | 8/1920 | Morrison | 406/56 |
| 1,614,713 | 1/1927 | Caracrisi | 406/61 |
| 1,798,857 | 3/1931 | Tyler | 406/56 |
| 2,315,079 | 3/1943 | Reeves | 406/61 |
| 2,799,540 | 7/1957 | Makinson | 406/94 |

FOREIGN PATENT DOCUMENTS

| 140881 | 6/1930 | Fed. Rep. of Germany | 406/61 |
| 761940 | 10/1953 | Fed. Rep. of Germany | 406/56 |
| 1215773 | 11/1958 | France | 406/56 |
| 5217202 | 9/1977 | Japan | 406/61 |
| 584995 | 1/1947 | United Kingdom | 406/56 |
| 2099778 | 12/1982 | United Kingdom | 406/56 |

Primary Examiner—Jeffrey V. Nase
Assistant Examiner—Jon M. Rastello
Attorney, Agent, or Firm—Raymond W. Augustin

[57] ABSTRACT

An apparatus for transporting granular materials is disclosed comprising a first conduit having an inlet for introducing the granular material, and transport pump for transporting the material through the first conduit. A nozzle provides a compressible fluid at a relatively high pressure for disaggregating the granular material within the first conduit, the material then proceeds from the first conduit into a second conduit. A relatively low pressure and high volume compressible fluid is supplied to the material to propel the material through the second conduit. There is also provided an adjustment means for changing the position of the nozzle within the first conduit. By adjusting the position of the nozzle, the apparatus can maintain disaggregation when the physical or chemical properties of the granular material are changed thereby preventing clogging of the apparatus due to insufficient disaggregation. By adjusting the position of the nozzle the apparatus can also achieve maximum disaggregation during normal operation, thereby minimizing the power required to operate the apparatus.

12 Claims, 4 Drawing Figures

U.S. Patent  Feb. 19, 1985  4,500,228
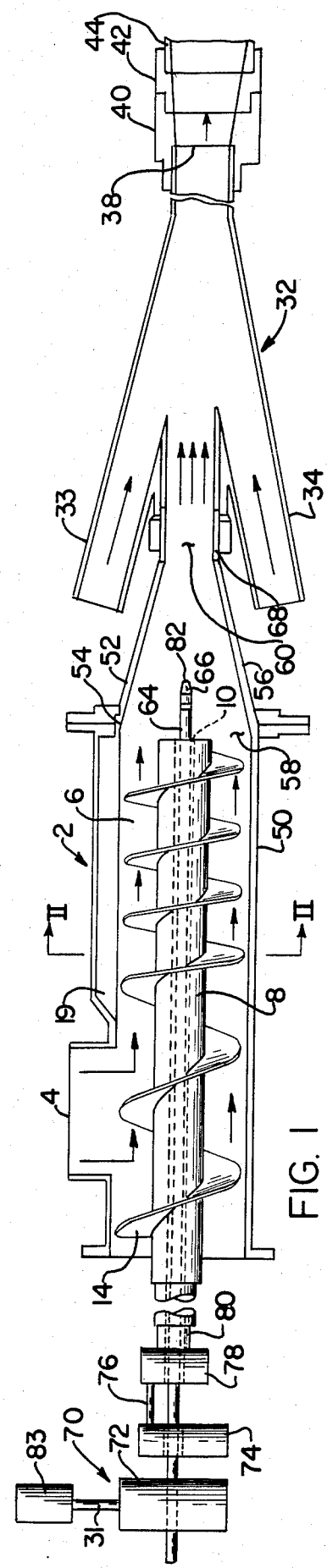
FIG. 1
FIG. 2
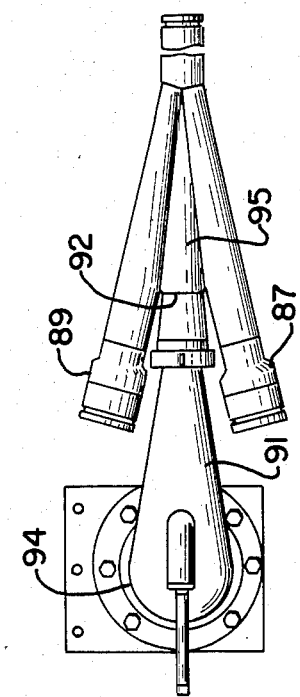
FIG. 4
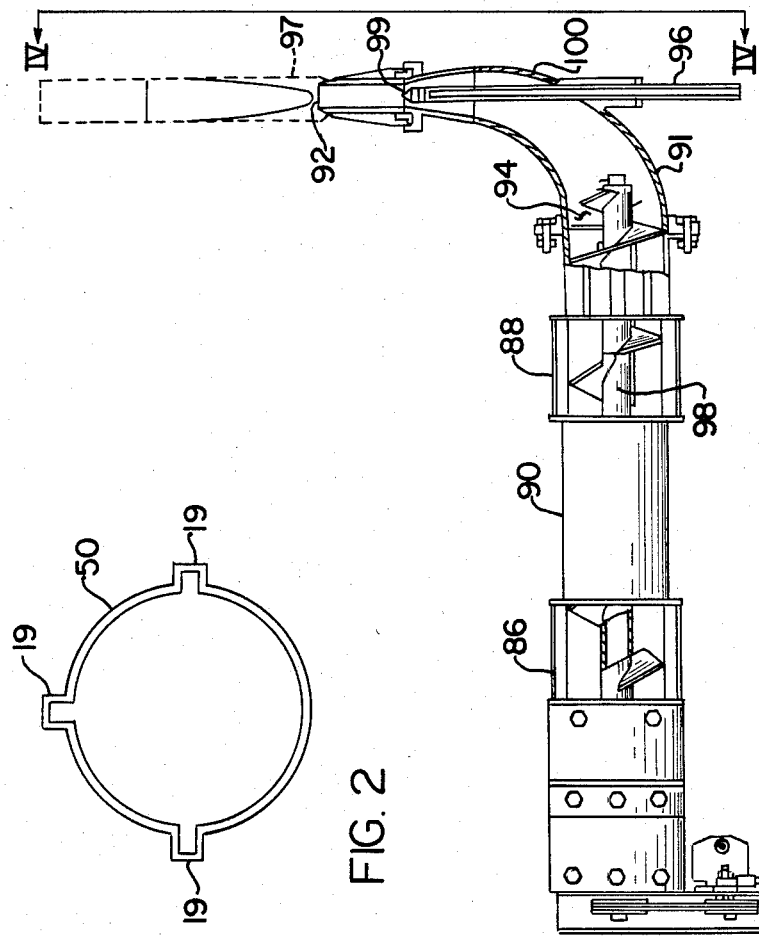
FIG. 3

GRANULAR MATERIAL PNEUMATIC TRANSPORT APPARATUS

BACKGROUND OF THE INVENTION

The present invention relates to an apparatus for transporting a granular material whether wet or dry and, more specifically relates to such an apparatus which is adapted to employ pressurized air as a means of disaggregating and propelling the granular material. The present invention is especially advantageous in instances where the granular material is mixed with a liquid forming a dense slurry.

DESCRIPTION OF PRIOR ART

In connection with the transportation of slurries such as might be encountered in respect of mine tailings, it has been known to use various means of effecting such transport.

The specific system which will perform effectively in such an environment is, in part, dependent upon moisture content, density, and relative sizes of the aggregate or solid material contained within the slurry.

With respect to systems employed in transport of concrete it has been known to utilize compressed air for disaggregation and a concrete pump for propulsion. With respect to relatively dry granular materials it has been known to employ compressed air for propulsion.

As dewatered mine tailings tend to involve a relatively dense, aqueous mineral slurry and the handling of large volumes of the slurry in an efficient manner is generally required, there remains a need for an improved apparatus and method for disaggregation and transport of such a slurry.

Even in systems where the disaggregation and transport of such slurries has been improved, there still lies a need for a method of fine tuning the disaggregation mechanism of such systems in order to minimize the power utilized by such systems.

There is a need to provide an apparatus wherein disaggregation may be maintained when physical or chemical properties of the granular material change, thereby preventing clogging resultant from insufficient disaggregation.

There is a need to provide an apparatus which may be readily adjusted to provide the most efficient operation in light of a change in the physical properties of the granular material being transported.

There is also a need to provide a system where the fine tuning of the disaggregation mechanism can be effectuated while the machine is operating.

SUMMARY OF THE INVENTION

The present invention has met the above-described need by providing an efficient means of disaggregating and transporting granular materials including relatively dense aqueous slurries and providing adjustment means to fine tune the disaggregating mechanism.

In a preferred embodiment of the invention an auger having a variable pitch cooperates with first conduit means which are provided with inlet means to receive and initiate transport of the granular material. A nozzle is provided to supply compressed air at a relatively high pressure which impinges on the granular material or slurry downstream of the auger and serves to disaggregate the slurry. Second conduit means receive the slurry from the first conduit means, whereupon the slurry is subjected to air at relatively low pressure and high volume from a second air supply means. This serves to propel the slurry. For certain installations third conduit means which have sections diverging generally downstream may receive a slurry from the second conduit means. One of the important features of the present invention is that the location of the nozzle is adjustable. The ability to adjust the location of the nozzle allows fine tuning of the system to get the best disaggregation possible therefore minimizing the power required to operate the apparatus. The ability to adjust the location of the nozzle also allows the apparatus to be fine tuned to provide maximum disaggregation when there has been a change in either the chemical or physical properties of the granular or slurry material. Maximum disaggregation of the granular material or slurry material allows a reduction in the volume of low pressure air required for propelling the granular or slurry material. Lowering the volume of the low pressure air results in lower power and operational cost for the apparatus. If the volume of low pressure air utilized for propelling the granular or slurry material is fixed, maximizing disaggregation will lower the power required to turn the auger screw to maintain a fixed material flow rate. Adjusting the position of the nozzle also allows the apparatus to maintain disaggregation when changes occur in the physical or chemical properties of the granular material, thereby preventing clogging of the apparatus due to insufficient disaggregation.

It is the desire of the present invention to provide an efficient apparatus for the transport of granular materials including granular materials which may be mixed with a liquid to provide a dense slurry. It is another desire of the present invention to provide an apparatus which provides means for disaggregation of granular materials during transport. It is another desire of the present invention to employ air at different pressures for the disaggregation and the transport functions.

It is the further desire of the invention to provide an apparatus which is adapted to handle relatively dense, aqueous-mineral slurries such as those which will be encountered in mine tailings. It is another desire of the present invention to provide a means for changing the location of the nozzle which provides the air which disaggregates the granular material.

It is another desire of the present invention to provide means for changing the location of the nozzle while the apparatus is operating. It is a further desire of the present invention to provide a method of obtaining the maximum disaggregation possible regardless of the physical or chemical property of the granular material.

It is another desire of the present invention to provide an apparatus wherein the disaggregation is maximized, therefore minimizing the volume of compressed air required for propelling the slurry. It is another desire of the present invention to lower the power required to turn the auger screw to maintain a given material flow rate when the volume of the low pressure air source is fixed.

It is yet another desire of the present invention to maintain disaggregation when physical properties or chemical properties of the granular material change, thereby preventing clogging of the apparatus due to insufficient disaggregation.

BRIEF DESCRIPTION OF THE DRAWINGS

FIG. 1 is a partially schematic cross section illustrative of an embodiment of the present invention.

FIG. 2 is a cross section illustration of the first conduit means taken through II—II of FIG. 1.

FIG. 3 is a plane view of another embodiment of the subject invention wherein the first conduit means has a second section which is curved.

FIG. 4 is a view taken along line IV—IV of FIG. 3 showing the second station of the first conduit means along with the second conduit means.

DETAILED DESCRIPTION

Referring now, more specifically to FIG. 1 there is seen an elongated first conduit means 2 which has an inlet 4 into which the granular material would be introduced. The arrows illustrated within the first conduit means show the direction of flow of the granular material through the first conduit means. Disposed within the chamber 6 defined by the first conduit means 2 is the transport means which includes an auger shaft 8. Auger shaft 8 has an axial bore 10 through which the disaggregating compressible fluid, or air will be passed in a fashion to be described hereinafter. A helical vane 14 of varying pitch is secured to the auger shaft 8 and is adapted to rotate therewith. In an alternative embodiment the transport means will include a peristaltic feed means or pump instead of the auger screw 8.

The first conduit means is basically composed of two sections. The first section 50 is generally cylindrical shaped with walls generally parallel to the auger. The second section 52 is generally shaped as a conical funnel or frustoconical. The conical funnel base 54 of the second section 52 is joined to the first section 50. As will be shown in a later embodiment the second section 52 can be curved such that a plane drawn perpendicular to the granular material flowing out of the first conduit first section discharge outlet 58 would intersect with a second plate drawn perpendicular to the direction of the flow of the granular material of said first conduit second section discharge outlet 60.

The auger shaft 8 has a generally axial bore 10. Slidably mounted within said axial bore is a lance means 64. The lance means 64 is capable of relative axial motion with respect to the auger shaft 8. The lance means 64 is connected to a nozzle 66. The movement of the lance means 64 allows the nozzle 66 to relocate its position with respect to the first conduit means 2 and the transport means or auger shaft 8.

The nozzle 66 delivers to the granular material a first supply of a compressible fluid which in most instances will be air. The discharge of high pressure air into the angular design defined by the exterior of the nozzle 66 and the second section of the first conduit 52 means acts to disaggregate the granular material thereby fragmenting the granular material into relatively small globules. The disaggregated granular material then passes through a focal tube 68 into the second conduit means 32.

Often conditions of the granular materials to be transported will change. Particles of different diameters may be fed into the system or, a liquid such as water may become increasingly or decreasingly present with the granular material. Therefore means must be provided to tune the apparatus for the change in material properties. Therefore adjustments means 70 are provided for tuning the apparatus by relocating the nozzle 66 with respect to the first conduit means 50 and the auger shaft 8. The adjustment means 70 of this embodiment is effectuated by movement of the lance means 64 axially with respect to the auger shaft 8 which allows the nozzle 66 to be relocated to find the position for maximum disaggregation. The maximum disaggregation allows the apparatus to minimize the flow rate of low pressure air required to operate the apparatus, as will be explained later. The movement of the lance means 64 may be manual, or a lance drive motor 72 may be installed to respond to an operator's command. The lance 66 may be relocated even when the auger shaft 8 is rotating.

In operation of the portion of the apparatus described hereinbefore a suitable power source such as an electric motor 74 affects rotation on output shaft 76 which is subjected to speed reducing action of a gear box 78 with the resultant rotary motion being experienced in output shaft 80 which serves to rotate the auger shaft 8. A suitable source of compressed air such as compressor 83 passes through pipe 31 and through a suitable sealed connection (not shown) results in introduction of pressurized air into the lance means 64 in which it emerges through the nozzle 66. While for simplicity, nozzle 66 illustrates only one discharge opening 82, however it will be appreciated that any number of openings may be employed upon the nozzle 66.

As a result of the varying pitch of vane 14, it will be appreciated that the auger will tend to move the granular material more quickly in the region of the vane 14 having a more coarse pitch, adjacent to inlet 4 than in the downstream region, which has a finer pitch. This sort of arrangement is found to be advantageous in order to facilitate efficient transport of granular material through the first conduit means first section 50 as it tends to result in a higher percent of the volume between adjacent vane portions at the downstream end being filled with the granular material and a reduced amount of air contained therein.

Referring to FIGS. 1 and 2, an additional feature which contributes to efficient flow and a high percentage of the volume between adjacent vane portions being filled with granular material will now be considered. The above feature resists undesired backflow of air to inlet 4. The generally cylindrical downstream section of a first conduit melans first section is provided with a number of radially outward projecting hollow recirculating tubes 19. In the form shown, the recirculating tubes 19 are generally U-shaped cross-section configuration and are in communication with the chamber 6. They are circumferentially spaced from each other and generally parallel to the axis of the auger shaft 8. In a preferred embodiment, each of the recirculating tubes, will have a height considered in a radial direction of about five to ten percent of the diameter of the first conduit means first section 50 with which it is associated, and a width of about 15 to 20 percent of such first conduit first section 50 diameter. As it is desired to maintain the auger at as high percentage of filling as possible in order to develop a pressure within the granular material and overcome any back pressure within the first conduit means 2, as well as contributing to efficient and rapid movement of a large volume of granular material, recirculating tubes 19 provide localized zones to receive additional granular material. This serves to resist undesired, potentially blocking buildup of granular material in the first conduit means 2.

Referring to the second conduit means 32 in greater detail it will be noted that in the form shown it is a generally Y-shaped configuration having a pair of connective ducts 33, 34 which may advantageously be substantially cylindrical for receipt of the propulsion air to move the granular material along. The propulsion air is provided at a lower pressure than the air which passes through the nozzle 66 and is provided in larger volume than the air that passes through the nozzle 66. It is noted that in the embodiment illustrated the connective ducts 33, 34 are disposed on opposite sides of the second conduit means 32. The granular material entering through opening 35 will meet the second compressible fluid supply, or air supply entering through connective ducts 33, 34 in chamber 36 which contain the vertex of the second conduit means. The high volume, low pressure air will serve to cause the granular material to be propelled through the discharge opening 38 in the second conduit means 32. Air supply to connective ducts 33, 34 may advantageously be supplied by a suitable size blower (not shown) connected to connective ducts 33, 34 by suitable pipe work or, may be provided directly into the connective ducts 33, 34. Also, if desired, additional connective ducts or a plenum may be employed to provide the same volume or a greater volume of propulsion air. In general, while the system would function with a single connective duct, it is preferred to provide at least two.

As mentioned previously the conditions of the granular material to be transported may change. The change in conditions may require a change in location of the nozzle 66 to achieve maximum disaggregation in the first conduit means 2. The increase in disaggregation will allow a lowering of volume of low pressure air supplied through ducts 33 and 34 required for operation. The lower volume of low pressure air supplied by ducts 33 and 34 will allow savings in power utilized to operate the blower (not shown) connected to ducts 33 and 34. If desired, the volume of low pressure air in ducts 33 and 34 can be fixed and the flow rate of material fed into inlet means 4 can be fixed, while decreasing the power supplied by electric motor 74 to auger shaft 8, to take advantage of the power savings. It is readily apparent that the savings in power consumption in the electric motor 74, or the low pressure air supply, will be advantageous in terms of cost.

To operate, all the granular material must be disaggregate into globules whose particle sizes are sufficiently small that the globules of granular material may be propelled by the low pressure air source which enters through ducts 33 and 34. When disaggregation is insufficient, the low pressure air will not be able to propel the granular material. The above occurs because the globules of granular material become too large. The large globules of granular material which are not propelled by the low pressure air will clog the apparatus, causing a shutdown in operation. By allowing the position of nozzle 66 to adjust, the disaggregation of the granular material may be maintained even when physical or chemical properties of the granular material have changed.

In the embodiment illustrated in FIG. 1, a third conduit means consisting of a series of pipes 40, 42, 44 which define a series of diverging passageways sequentially receives the slurry from the second conduit means discharge outlet 38. The above serves to facilitate the streamline flow of the slurry emerging from the second conduit means 32.

FIG. 3 shows an embodiment very similar to that shown in FIG. 1 however with some differences. FIG. 3 has two inlet means or feed hoppers 86 and 88 for feeding the granular material into the first section of the first conduit means 90. In the embodiment shown in FIG. 3 the discharge of the second section of the first conduit means 92 is not coaxial with the discharge of the first section of the first conduit means 94. A plane perpendicular to the flow of material at the discharge of the first section of the first conduit means 94 will intersect with a plane drawn perpendicular to the flow of material at the discharge of the second conduit means 92.

Another major difference between the embodiment shown in FIG. 1 and FIG. 3 is that the lance means 96 of FIG. 3 is not contained within the auger shaft 98, but penetrates the conical funnel wall 100 of the second section of the first conduit means 91. This new lance 96 design is advantageous in that one does not have to modify the design of the auger shaft 98 and the nozzle 99 may be more readily removed for replacement or repair. The lance means 96 is positioned such that the nozzle 99 will tend to move in a direction generally coaxial with the direction of flow of the granular materials as the materials exists from the discharge end of the second section of the first conduit means 92.

FIG. 4 is an end view taken along lines IV—IV of FIG. 3. FIG. 4 shows the second section of the first conduit means 91 along with the second conduit means 95 with connective ducts 89 and 87. In the embodiment shown in FIGS. 3 and 4 the focal tube 97 is made integral with the second conduit means 95. The flow of granular material shown in FIG. 4 is all in one plane, however, there is no requirement that the above conditions exist. The design of the second section of the first conduit means can be modified in such a manner that a first plane perpendicular to the flow of granular materials out of the discharge outlet of the first section of the first conduit means is parallel to a second plane perpendicular to the flow of granular materials out of the discharge outlet of the second section of the second conduit means, while at the same time the discharge outlets are not coaxial.

In both the embodiments shown in FIGS. 1 and 3 the second section of the first conduit means feeds into a substantially straight pipe referred to as the focal tubes 68 and 92 respectively. The length, diameter and material surface property of the focal tube affect operational characteristics of the transport system and will ideally be designed for the conditions of granular material to be transported. After the material leaves the focal tube it will enter the second conduit means as previously described.

It will be appreciated therefore, that the present invention provides an apparatus and method for effecting efficient disaggregation and transport of granular material through use of a combination of high pressure disaggregation air and low-pressure, high-volume propulsion air, with the disaggregation occurring prior to the propulsion air introduction. In addition, through the use of unique auger means having variable pitch initial granular material transport and disaggregation is accomplished within the first conduit means before the granular materials enter the second conduit means.

While reference has been made herein to first, second and third conduit means, it will be appreciated that this description has been provided in the interest of disclosing the best mode known to applicant of practicing the invention and in terms of physical construction as distinguished from function, the components may be made in a different way and assembled to accomplish the functionally equivalent results.

Whereas particular embodiments of the invention have been described above for purposes of illustration, it will be appreciated by those skilled in the art that numerous variations of the details may be made without departing from the invention as described in the appended claims.

We claim:

1. An apparatus for transporting a granular material comprising:
   a first axially extending conduit means having a narrowing frustroconical discharge portion at a first end thereof:
   inlet means for introducing said granular material into said first conduit means;
   an auger means axially extending within said first conduit means for transporting said granular material therethrough;
   a first compressible fluid conduit means axially extending through said auger means the inlet to said fluid conduit means extending axially outwardly of a second end of said first conduit means;
   a nozzle associated with the discharge end of said first fluid conduit means and located within said frustroconical discharge portion for delivering to said granular material a compressible fluid at a low volume and high pressure from a first source, said first compressible fluid capable of disaggregating said granular material;
   second conduit means having an inlet directly connected to said narrow end of said frustroconical discharge portion of said first conduit means for receiving said granular material therefrom;
   a second conduit compressible fluid supply means substantially adjacent to the inlet of said second conduit means for delivering to said second conduit means a compressible fluid at a high volume and a low pressure from a second source, said compressible fluid capable of propelling said disaggregated granular material out of said second conduit means; and
   motor means located outwardly of said second end of said first fluid conduit means for axially pushing or pulling said nozzle intermediate said frustroconical discharge portion of said first conduit in response to remote commands.

2. An apparatus as recited in claim 1 wherein the granular material is generally free of liquid.

3. An apparatus as recited in claim 1 with a plurality of inlet means.

4. An apparatus as recited in claim 1 wherein the granular material is generally mixed with liquid.

5. An apparatus as recited in claim 1 wherein said auger means has a vane of varying pitch.

6. An apparatus as recited in claim 1 wherein the pitch of said auger vane is finer toward the downstream end thereof than toward the upstream end thereof.

7. An apparatus as recited in claim 1 wherein said first conduit means having at least one generally outward projecting recirculating tube disposed adjacent an outer portion of said auger vane.

8. The apparatus as recited in claim 7 including a plurality of circumferentially spaced said recirculating tubes.

9. An apparatus as recited in claim 8 further comprising said recirculating tubes having a height equal to about 5 to 10 percent of the diameter of said first conduit means adjacent to said tubes.

10. The apparatus as described in claim 1 wherein said second conduit means having a discharge outlet which is generally axially aligned with said auger means.

11. An apparatus as recited in claim 1 further comprising said second fluid supply conduit means having at least two connective ducts connected to said second conduit compressible fluid supply means and said connective ducts being disposed on opposite sides of said second conduit means.

12. An apparatus as recited in claim 1 wherein said auger means has a generally axial bore and said adjustment means comprises lance means which is slidably mounted within said auger axial bore and said lance means being capable of relative axial motion with respect to said auger and said lance means being connected to said nozzle means.

* * * * *